June 9, 1931.   P. B. SAMPLE   1,809,288
METHOD OF AND APPARATUS FOR CONTROLLING MECHANICAL OSCILLATIONS
Filed Nov. 12, 1929
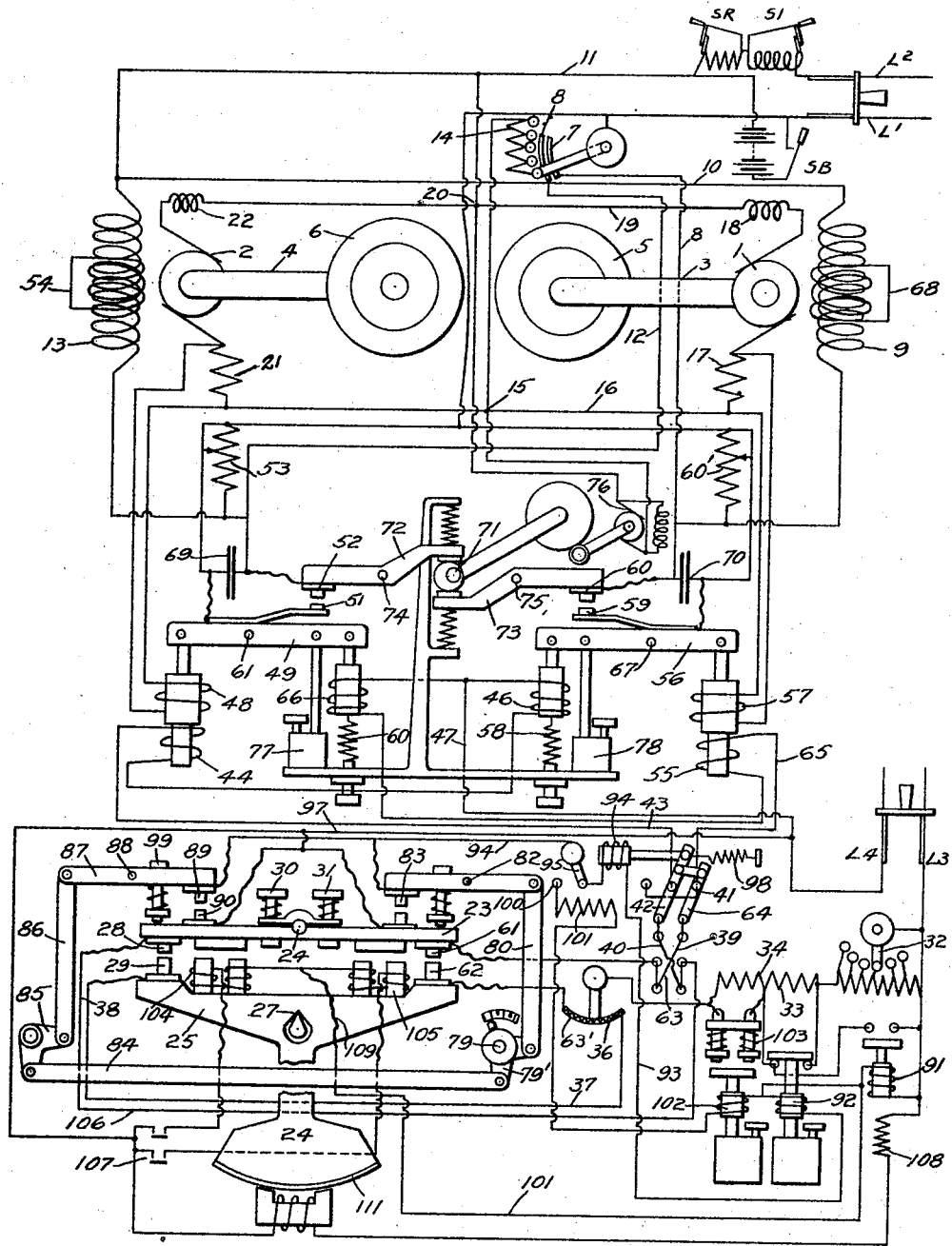
Percy B Sample
INVENTOR
BY O. A. Adams
ATTORNEY Patented June 9, 1931

1,809,288

UNITED STATES PATENT OFFICE

PERRY B. SAMPLE, OF NEW YORK, N. Y., ASSIGNOR OF ONE-FOURTH TO IRA J. ADAMS

METHOD OF AND APPARATUS FOR CONTROLLING MECHANICAL OSCILLATIONS

Application filed November 12, 1929. Serial No. 406,703.

This invention relates to methods of and apparatus for controlling mechanical oscillations and more particularly oscillations of ships produced by waves.

One object of the invention is to oppose the oscillating forces set up in an object by external forces and keep the object in a state of equilibrium.

Another object of the invention is to reduce the roll or oscillation of a vessel to a predetermined point to permit the firing of guns at the desired angle of elevation.

Another object of the invention is to produce a roll or oscillation in a vessel in a calm sea to permit the desired elevation of guns to be fired at the enemy.

Other objects will appear in the following description, reference being had to the drawing in which the single figure of the drawing is an illustration and gives conventional circuits and associated devices to carry out the principles of the invention.

The waves of the sea cause ships to roll in substantial synchronism therewith. In most cases this roll is decidedly objectionable and various attempts have been made to balance or stabilize the vessel against the forces of these waves. In some cases gyroscopes have been used on ships to prevent the roll of the vessel due to the inherent resistance of a rotating body to be deflected out of the plane of rotation. However, when a gyroscope has once been turned out of its plane of rotation it will offer no further force to get back into its original plane of oscillation but will be stable in the new plane to which it has been moved.

In my invention there is a continual force acting to return the vessel to its original position, there being substantially only one plane in which the stabilizing forces will cease to act on the vessel and this is when the deck is in the horizontal plane.

To produce the stabilizing forces I mount two dynamo electric machines 1, 2, on the ship with the shafts 3, 4, of the armatures extending parallel to the length of the ship and secured to flywheels 5 and 6. These dynamo electric machines in a calm sea with a vessel in equilibrium are designed to run as motors and are so connected that the armatures rotate the flywheels in opposite directions as indicated by the arrows in the drawing.

The motors will run at a substantially constant speed when the vessel is stable in a calm sea and the reaction of the field frames (not shown) resting on the deck of the vessel will balance each other, that is, the reaction of the field frame of motor 1 would tend to rotate the vessel, say counterclockwise, while the frame of motor 2 would tend to rotate it clockwise. These two forces would balance and there would be no turning effort exerted on the vessel. However, under these circumstances the reaction of the field frames against the vessel would be slight because the motors would be running idle and there would be very little torque between the field and the armature through the magnetic flux.

If, however, the vessel is caused to roll by the waves means is provided to strengthen the field of one of these motors and to weaken the field of the other. This will cause the first motor to act as a generator, the driving force being the kinetic energy of flywheel 6. The other motor will continue to act as a motor, but since its field is weakened it will speed up in accordance with well known principles. The reaction of the generator 2 is in the direction of rotation of the flywheel, that is, counterclockwise, and the reaction of the field frame in the motor 1 is opposite to the direction of rotation of the flywheel 5, or counter-clockwise. Therefore, when the fields of the two dynamo electric machines have been changed in the way described reaction of their field frames will both be counter-clockwise, that is, the field frame will attempt to turn the vessel counter-clockwise. For stabilizing vessels the connections to the motors are so made that this counter force of the field frames is opposed to the direction of roll of the vessel produced by the waves and the counter force of the field frames can be made as great as desired by appropriately designing the flywheels and the electrical control apparatus. The manner in which the foregoing effects are produced will now be described in detail.

To start the dynamo electric machines starter switch S will be in the position shown and for the present we will assume that battery switch SB is open and switches SR and SI are closed, as illustrated in the drawing. Current will then flow from main L1 through the starter arm, contact 7, wire 8, field 9, wires 10, 11, back to main L2. Current will also flow through the starter arm in contact strip 8, wire 12, to field 13 and wire 11 back to the main L2. The full potential of the line will be thrown on the fields at this time to give a heavy starting torque. Current will flow to the armatures of the dynamo electric machines from main L1, the arm of the starter switch, through starting resistance 14 to junction point 15 from whence current will flow through wire 16, resistance 17, armature of the machine 1, commutator coil 18, wires 19, the junction point 20 and through wire 11, back to the main L2. Current will also flow from junction point 15 through resistance 21, armature of dynamo electric machine 2, commutator coil 22, to junction point 20 and back to main L2 in the way already described. The motors will start to accelerate the heavy flywheels 5 and 6 and by appropriate movement of the arm of the starter switch S to cut out resistance 14 at the desired rate the motors will be brought up to speed.

Now, let it be supposed that the vessel is caused to roll by the waves. When the vessel rolls through a small angle bar 23 the pendulum switch will move with the vessel through the frictional contact between the bar and a pin 24 fastened to the switchboard supported by the vessel. Bar 25 will not move because it is fastened to pendulum weight 26 which tends to hold its position on the supporting pivot 27. This will bring the contacts 28 and 29 into engagement and as the vessel rolls still further bar 23 will remain stationary on account of the engagement of the contacts 28 and 29. The frictional contact between pin or pivot 24 and the bar 23 permits this. This frictional contact may be controlled by means of the tensioning springs 30, 31, which may be adjusted by appropriate means such as the screws shown in the drawing. The bringing of contacts 28 and 29 together causes current to flow from main L3, rheostat 32, short-circuiting contacts around resistance 33, resistance 34, the right-hand side 36 of the potentiometer wire 37 to contact 29, thence to contact 28, wire 38 reversing switch 39 through cross connection 40, through the reversing switch 41 by way of bar 42 to wire 43, coil 44, coil 46, wire 47 and thence to main L4.

It will be noted that coil 48 above coil 44 is energized because it is connected in parallel to resistance 21 in the armature circuit of dynamo electric machine 2. At this time the direction of current in coil 48 is such as to produce a magnetic flux that aids the flux produced by coil 44. At this time there is no current flowing through coil 66 surrounding the coil attached to the opposite end of the switch bar 49. The combined pull of coils 44 and 48 therefore overcomes the tension of spring 50 attached to the other end of bar 49. This brings contacts 51 and 52 together to short-circuit resistance 53, placed in the field circuit of dynamo electric machine 2 when the starter switch was moved to full running position and opening the continuity between contact strips 7 and 8.

The short-circuiting of resistance 53 increases the current flowing through field 13. The increase of flux through field 13, however, is retarded by short-circuiting coil 54 on account of the current induced therein. As soon as the current becomes steady the field short-circuiting coil 54 will draw no further current. The short-circuiting coil 54 thus tends to smooth out the field current surges and by doing this it minimizes the sparking at the switch contacts 51 and 52. It also keeps down the sparking at the commutator of the machine. This increase of current in field 13 converts dynamo electric machine 2 into a generator because with that field strength the machine is running above the corresponding speed as a motor. The kinetic energy of flywheel 6 drives the armature forward in the same direction and feeds current into the armature of motor 1.

When contacts 28 and 29 of the pendulum switch are brought together coil 46 is energized, as already explained. There is no current in coil 55 acting on the core fastened to switch bar 56 and the current in coil 57 shunted around resistance 17 is insufficient to overcome the tension of spring 58. Therefore, contacts 59 and 60 associated with switch arm 56 remain open for a longer length of time than when the vessel was in equilibrium. This correspondingly weakens the field of dynamo machine 1 and causes it to speed up as a motor. In doing this it will draw a heavy armature current in order to accelerate the heavy flywheel 5. This heavy armature current is drawn from the armature of dynamo electric machine 2 now running as a generator but some current is drawn from the mains L1 and L2 to make up for losses in the machines and the differential action on the machines due to the rolling of the vessel. When the vessel is rolling it partially rotates by the amount of the angle of the roll, the field frames of each machine. This partial rotation of the field of the generator reduces to a small extent the current generated therein and it increases the current in the motor for a similar reason. The mains have to make up this difference on the load of the two machines due to the rolling of the vessel. Roughly speaking, the total difference between the load of the machine running as a motor and the one running as a generator should be less than 15% of the whole load, the 85% being furnished by the retarded flywheel.

When the roll of the vessel is produced, as just described, the reaction of the field frame of machine 2 will be in the same direction as the reaction of the field of machine 1 and this will be arranged to oppose the roll of the vessel. In other words, the reaction of the field frames will tend to roll the vessel in the opposite direction. By appropriately designing the resistances, the flywheels, the tensioning of springs 30 and 58, and otherwise proportioning the various constants in the circuits, the reacting force of the field frames may be made to counteract the roll of the vessel produced by the waves and maintain the ship in equilibrium.

The regulating switches associated with bars 49 and 56 will cause the current through the armatures and machines 1 and 2 to be substantially constant, or if desired, to increase or decrease during the stabilizing action. When the machine 2 is operating as a generator the current through coil 48 will be in a direction opposite to the direction of flow of the current when the same machine is operating as a motor. Therefore, when this current increases to a predetermined extent it will oppose the flux of coil 44 sufficiently to permit the spring 50 to open the contacts 51 and 52 and reinsert resistance 53 in the field circuit. This will reduce the armature current and when it drops below a predetermined point the tension of spring 50 will again be overcome by the preponderating flux of coil 44 over that of coil 48. In this way switch bar 49 will oscillate around its pivot point 61 to open and close contacts 51 and 52 at a sufficient rate to keep the desired current flowing through armature 2. As has been stated, this current may be maintained constant as the energy is absorbed from flywheel 6, or it may be made to increase or to have any other desired value. In practice I prefer to keep the current substantially constant.

The current flowing through armature 1 will likewise be maintained at the desired value by the action of coils 57, 46 and spring 58. If machine 1 tends to speed up too rapidly and draw too heavy an armature current the drop in resistance 17 will be sufficient to produce a flux in coil 57 that will overcome the pull of coil 46 and spring 58 and bring contacts 59 and 60 together. When this happens resistance 60' in the circuit of field 9 will be short-circuited. This will decrease the acceleration of machine 1 which is running as a motor. Contact 59 will therefore float up and down through the action of the coils and spring in the same way as in contact 51 on bar 49 and maintain the desired current flowing through the armature of machine 1.

If the waves or other forces tend to roll the vessel in the opposite direction bar 23 will move with the vessel and open contacts 28 and 29 on the pendulum switch. This will deenergize coils 44 and 46 of the current regulator of the dynamo electric machines. At substantially the same time contact 61 of the pendulum switch will be brought into engagement with the contact 62. This will cause current to flow through left-hand end 63 of the potentiometer through contact 62, contact 61, connection 63 of reversing switch 39, bar 64 of reversing switch 41, wire 65, coil 55, coil 66, wire 47, back to the mains. At this time the energization of coil 66 will aid the spring 50 to overcome the pull of coil 48 (coil 44 at this time being deenergized) and separate the vibrating contacts 51 and 52 for greater periods of time. The energization of coil 55 will produce a flux that will aid the flux of coil 57 to overcome the tension of spring 58 (coil 46 at this time being deenergized) which will rotate bar 56 around its pivot point 67 and bring vibrating contacts 59 and 60 together for greater periods of time.

The effect of this conjoined action of the bars 56, 49 is to weaken the field of machine 2 by maintaining the shunt around field resistance 53 open for greater periods of time and to strengthen the field of machine 1 by short-circuit resistance 60' for greater periods of time. This will convert machine 2 into a motor and machine 1 into a generator. The reaction of the field frames of these two machines on the vessel will be in the same direction but the direction will be reversed to that previously considered. In other words, the reaction of both field frames will be against the force tending to roll the vessel. As before, the current in the armatures of the motor 2 and generator 1 will be maintained at the desired value by the regulator bars 49 and 56 to balance the force of the roll and keep the vessel in equilibrium. The correct value of current in these machines may be obtained by adjustment of the tension of springs 50 and 58, as already referred to.

Sudden changes of flux in the field coil 9 are opposed by the counter flux set up in short-circuiting coil 68, the action being the same as that of coil 54 already described.

The adjustment of the currents in the dynamo electric machines and therefore the value of the reacting force may likewise be controlled by adjustment of the resistance in rheostat 32 and the balance between the machines 1 and 2 may be further controlled by adjusting the resistances 36 and 63 of the potentiometer.

The sparking of the commutators in machines 1 and 2 may be minimized by coils 18 and 22 in accordance with well known principles.

The sparking at contacts 51 and 52 and contacts 59 and 60 may be further reduced by use of condensers 69 and 70 connected in shunt to the contact.

The contacts 52 and 60 are preferably kept in vibratory action by means of cam 71 contacting with the ends of bars 72 and 73 pivoted at 74 and 75 on the opposite ends of which bars the contacts are secured. Cam 71 is rotated by any appropriate means such as by a small shunt motor 76 connected across the means L1, L2. These contacts 52 and 60 may be floated up and down by any other appropriate means.

The regulator bars 49 and 67 are caused to have steady motion up and down under action of the pulling forces by connection to dashpots 77, 78, designed to yieldingly oppose movement of the bar in either direction. Such dashpots are well known in the art, but it may be generally said that this action may be obtained by having a bypass around from one side of the cylinder to the other with an adjustable restriction in the bypass to control the movement of the oil or other fluid forced one way or the other by the movable piston.

With the arrangement described one may so proportion the armature currents of the dynamo electric machines as to produce the desired reacting force to balance out the opposing force in any object that is subject to mechanical oscillations.

The arrangement also may be used to produce desired oscillations in an object instead of opposing undesired oscillations. One instance where it is desirable to produce such oscillations is in a war vessel on a calm sea or when there is insufficient roll of the vessel to permit the guns being fired at the desired angle of elevation. The manner in which these oscillations may be generated or produced in an object, for example, a vessel, will now be described.

Suppose the vessel is in a moderate sea and it is desired to roll the vessel, say 10° in order to obtain the desired elevation of the guns at the maximum amplitude of oscillation. Hand reversing switch 39 would be thrown to the left-hand position as shown in the drawing and regulator 79 of the pendulum control switch would be set to 10° on the scale. Through link 80 connected to bell crank 79' and bar 81 pivoted at 82, contact 89 would be raised to the desired position through link 84, bell crank 85 and link 86. The lever 87 pivoted at 88 would raise contact 89 to the desired position. At this time it is preferable to cut out the resistance in rheostat 32 so that there will be maximum pull of the coils 44 or 55, as the case may be, in the current regulators. As soon as the vessel has substantially reached the desired roll of 10° some of the resistance in rheostat 32 may be cut back into the circuit as may be necessary.

The circuit through contacts 28 and 29 of the pendulum switch previously described would now pass through coil 55 and coil 66 instead of coil 44 and coil 46. Also the circuit through contacts 61 and 62 previously described would pass through coils 44 and 46 instead of coils 55 and 66 as previously described. This means that when the vessel rolls slightly in a moderate sea and contacts 28 and 29 or 61 and 62 are brought together the reacting force of the field frames of machines 1 and 2 will be in the same direction as the force of the roll. Instead of stabilizing the vessel regulator will increase the roll. The circuits in this situation need not be traced as they will be the same as already described except that the reversing switch 39 will reverse the action as just referred to.

The desired roll of the vessel may be produced by regulating hand rheostat 32 to adjust the pull on the regulator bars 49 and 56 and thereby control the armature current in the machines 1 and 2. It, of course, would be difficult to exactly maintain the desired roll by means of rheostat 32 so that it should be set to maintain more than the maximum roll or 10°. Suppose that the vessel is rolling so as to bring contact 28 into engagement with contact 29 of the pendulum switch. This would convert machine 1 into a generator, slow down the flywheel 5 and speed machine 2 up as a motor to accelerate flywheel 6 and the reaction as described would aid the roll of the vessel.

When the vessel reaches the desired angle of roll, say 10°, the engagement of contact 29 with contact 28 will prevent further movement of bar 23 and the vessel would rotate the supporting pivot 24 in the frictional bearing of that bar. Pivots 88 and 82 and the regulator 79 and associate bell crank levers are secured to a panel board supported by the vessel. Therefore, as the vessel continues to roll slightly beyond 10° there is relative movement between contact 89 on bar 87 and upper contact 90 on the left-hand end of bar 23. These two contacts will therefore be brought together. This will close the circuit from main L3 to solenoid coil 91, solenoid coil 92, wire 93, solenoid coil 94, switch 95, wire 96, contact 89, contact 90, wire 97, back to main L4. This will short-circuit the resistance of rheostat 32 by energization of coil 91 and it will energize coil 92. The closing of this circuit will also energize coil 94 which will pull reversing switch 41 to the left. This will reverse the action by deenergizing coils 55 and 66 and sending the current through coils 44 and 46. This will convert machine 2 into a generator and machine 1 into a motor and the reaction of their field frames will now oppose the roll of the vessel arresting it substantially at the 10° angle set by control device 79. When the ship starts the return roll contacts 89 and 90 will be open. This deenergizes coils 91, 92 and 94. The deenergization of coil 94 permits spring 98 to snap the reversing switch 41 back into the right-hand position. As the vessel starts the return roll contacts 89 and 90 will open prior to the opening of contacts 28 and 29 because of the action of spring pressed pin 99. This insures that contacts 89 and 90 open before contacts 28 and 29.

Prior to the reversal solenoid coil 92 had opened the shunt around the resistance 33. This switch is connected to a dashpot that permits free upward movement of the switch as shown in the drawing, but restricts its downward movement such as by a bypass with a ball or other valve (not shown), as well understood in the art. This inserts resistance 33 in the control circuit and keeps it there for several rolling cycles and thus reduces the tendency of the apparatus to roll the vessel, and tending to prevent its rolling the vessel beyond the 10° angle in succeeding oscillations until the switch drops back into position and again short-circuits resistance 33. At that time the system will operate with its former set rolling force again. The length of time that the resistance 33 remains in circuit can be controlled by appropriate adjustment of the bypass in the dashpot.

If instead of a moderate sea there is a heavy sea running that rolls the war vessel, for example, to 15° and it is desired to reduce this roll to 10° for firing guns, switch 95 would then be placed against contact 100, placing resistance 101 in the circuit of coil 91 and coil 102. This movement of switch 95 opens the circuit of coil 94 on the reversing switch 41, but no current is flowing through. The rolling of the vessel would be opposed by the dynamo electric machines 1 and 2 through closing of say, contacts 28 and 29 and the new position of reversing switch 39 in a manner that was first described, but rheostat 32 would be regulated so as not to reduce this roll to zero, but to let the roll exceed somewhat the desired 10°. When the roll exceeds 10°, assuming that the vessel is rotating contacts 28 to the left, as shown in the drawing, bar 23 will remain stationary as soon as contact 28 engages contact 29. Further movement of the vessel will cause this bar to slip on its pivot 24. Lever 87 and its attached contact 89 will roll with the vessel, however, and contact 89 will be brought into engagement with contact 90 soon after the 10° angle is passed. This will close the circuit from coil 91 through coil 102, resistance 101, switch 95, contacts 89 and 90, back to main L4. This will energize coils 102, 91, and short-circuit resistances 34 and 32, increasing the current flowing through the control rheostat circuit 32. As has previously been pointed out this increase of current will maintain a stronger stabilizing action on regulating switch bars 49 and 56, thus keeping the roll down to the desired 10°.

The switch controlled by coil 102 is preferably attached to a dashpot that will permit quick upper movement, as shown on the drawing, but slow downward movement. As the plunger is forced upward it compresses contacts 103 against their springs. Then as the switch plunger moves slowly downward against the retarding action of the dashpot these contacts 103 will recede downward and maintain the shunt around resistance 34. The dashpot will preferably be adjusted to make this short-circuit for one or more cycles, or even more, of the roll of the vessel, and this adjustment will permit the operator to so control the apparatus as to effectively maintain the 10° angle in a sea that tends to roll the vessel at a greater angle.

On war vessels a condition may sometimes exist when it is desired to roll the vessel to the desired angle of elevation of the guns and maintain that maximum elevation for a short period of time to give sufficient pause in the roll to permit the gun to be accurately fired. Electromagnets 104 and 105 on the pendulum switch bar 25 are provided for this purpose and their energization is controlled by switches or push buttons 106 and 107. Let it be assumed that the stabilizer is rolling the vessel in a smooth or a moderate sea to some high angle desired by the gunners and it is also desired to hold the maximum roll to permit the gunners to fire with greater accuracy. Again, let it be assumed that the vessel is rolling in such direction as to bring contact 28 into engagement with contact 29 on the pendulum switch bar 25. A short time before the vessel reaches the maximum roll the push button or switch 106 is pressed to bring the contacts into engagement. This energizes coil 104 by current coming from main L3, coil 91, conductor 109, coils 105 and 104, push button 106 and wire 97 back to main L4. This energizes these coils and holds contacts 28 and 29 together by action of armature 68 positioned on switch bar 23. When the vessel starts the return roll contacts 28 and 29 are not open as would normally be the case because of this action of magnets 104 and 105. The circuit of regulating coil 44 is therefore not open at the pendulum switch points and dynamo electric machines 1 and 2 continue their stabilizing action and maintain the vessel in the desired angle of roll for a short period of time to enable the guns to be fired. This push button will be maintained closed only for a short period of time.

To steady the movement of pendulum 26 I may use a damping arrangement such as an electromagnet 110 positioned adjacent to a copper or other metallic strip 111 attached to the base of the pendulum weight. This magnet is connected to main L3 through resistance 108 and to main L4 through wire 97. Eddy currents will be induced in the copper strip 111 when it is moved through the field of the magnet 110 in the well known way. Sudden movement will be retarded by this eddy current action to a greater extent than slow movements.

The flywheels and associated devices will be designed so that the energy absorbed by acceleration of one flywheel will practically equal the energy given out by the retarded flywheel. Under such conditions the current taken from the means L1 and L2 will be that required to make up the losses in the dynamo electric machines and loss of energy due to rolling of machine. Therefore, there will be practically no undue surges of current into and out of these means. However, in some cases there may be such surges and to dampen them out I may place a battery across the mains by closing switch SB to absorb the excess of energy coming from the machines and to feed such energy back into the machines when an excess would otherwise have been drawn from the means L1 and L2. To further dampen out any surge of current into or out of the mains I may open short-circuiting switches SR and SI to throw the inductance 1 and the resistance R into circuit between the battery and the mains. This would force the surge of current to be taken by the battery instead of by the mains. However, in most cases the use of the battery and damping device would be unnecessary.

Having described my invention, what I claim is:

1. The method of stabilizing an oscillating object which consists in rotating two flywheels in opposite directions in planes that are parallel to the plane of oscillation, applying force to retard one flywheel and accelerate the other to produce reaction forces in opposition to the forces of oscillation and maintaining said applied forces substantially constant as the amplitude of oscillation increases.

2. The method of stabilizing an oscillating object which consists in rotating two flywheels in opposite directions in planes that are parallel to the plane of oscillation, applying force to retard one flywheel and accelerate the other to produce reaction forces in opposition to the force of oscillation and regulating the application of said applied force independently of the angle taken by the object.

3. The method of stablizing an oscillating object which consists in rotating two flywheels in opposite directions in planes that are parallel to the plane of oscillation, applying force to retard one flywheel and accelerate the other to produce reaction forces in opposition to the forces of oscillation, and regulating the application of said applied forces to each flywheel independently of the other.

4. The method of oscillating an object which consists in rotating two flywheels in opposite directions in planes that are parallel to the desired direction of oscillation, applying force to retard one flywheel and accelerating the other to produce reaction forces on the object in the desired direction of oscillation, and reversing the force applied to said flywheels when the object has reached a predetermined amplitude of oscillation.

5. The method of oscillating an object which consists in rotating two flywheels in opposite directions in planes that are parallel to the desired direction of oscillation, applying forces to retard one flywheel and accelerate the other to produce reaction forces on said object in the desired direction of oscillation, maintaining said forces substantially constant and reversing the forces applied to said flywheels when the object has reached a predetermined amplitude of oscillation.

6. The method of oscillating an object which consists in rotating two flywheels in opposite directions in planes that are parallel to the desired direction of oscillation, applying force to retard one flywheel and accelerate the other and maintaining the application of forces to said flywheels when maximum amplitude has been reached to delay the oscillation of the object at such amplitude.

7. In devices for controlling oscillations of an object, two dynamo electric machines having stationary members attached to said object and rotary members rotating in opposite directions in planes parallel to the plane of oscillation, one of said members in each machine being electrically connected to the source of current supply and to the member of the other machine, and means for maintaining one machine as a generator and the other as a motor during one portion of the cycle and for maintaining the former as a motor and the latter as a generator during another portion of the cycle.

8. In devices for controlling oscillations of an object, two dynamo electric machines supported on said object and having their armatures rotating in opposite directions in planes parallel to the plane of oscillation and electrically connected to each other and to the source of current supply, a rotatable mass associated with each of said machines, and means controlled by the oscillation of the object to strengthen the electrical field of one of said machines and weakening that of the other.

9. In devices for controlling oscillations of a vessel, two dynamo electric machines supported on said vessel and having their armatures electrically connected in parallel across the supply mains, flywheels associated with the machine and rotated thereby in opposite directions in planes that are parallel to the plane of oscillation, and means controlled by the oscillation of the vessel to weaken the electrical field of one machine and strengthen that of the other.

10. In devices for controlling oscillations of a vessel, two dynamo electric machines supported on said vessel and having armatures electrically connected in parallel across the source of current supply, flywheels associated with armatures and rotated in directions opposite to each other in planes that are parallel to the direction of oscillation, means controlled by the oscillation of the vessel to weaken the electrical field of one machine and strengthen that of the other, and means for controlling at will the value of said electrical fields.

11. In devices for controlling oscillations of a vessel, two dynamo electric machines supported on said vessel and having armatures connected in parallel across the source of current supply, flywheels associated with the armatures and rotated in directions opposite to each other in planes that are parallel to the direction of oscillation of the vessel, means controlled by the said oscillations to weaken the electrical field of one machine and strengthen that of the other, and means for maintaining the reaction between said machines and the vessel substantially constant during a portion of the oscillation.

12. In devices for controlling oscillations of a vessel, two dynamo electric machines supported on said vessel and having their armatures rotating in opposite directions in planes parallel to the plane of the oscillations, rotatable masses connected to the armatures, a device adapted to maintain a substantially unvarying position during the oscillating cycle, contacts on said device, contacts adapted to move with the oscillating vessel, electromagnetic devices connected to said contacts and adapted to reversely vary the field currents of said machines to retard one of said masses and accelerate the other.

13. In devices for controlling oscillations of a vessel, two dynamo electric machines supported on said vessel and having their armatures rotating in opposite direction in planes parallel to the plane of the oscillation supply, rotatable masses connected to the armatures, a resistance in the field circuit of each machine, electromagnetic devices for short-circuiting each resistance, a contact connected to each of said electromagnetic devices, and means adapted to connect the source of current supply alternately to said contacts.

14. In devices for controlling oscillations of a vessel, two dynamo electric machines supported in said vessel and having their armatures rotating in opposite directions in planes that are parallel to the plane of the oscillation, and electrically connected to each other and to the source of current supply, rotatable masses connected to the armatures, a resistance in the field circuit of each machine, electromagnetic devices for short-circuiting said resistance, a contact connected to each of said electromagnetic devices, and means adapted to connect the source of current supply alternately to said contacts.

15. In devices for controlling oscillations of a vessel, two dynamo electric machines supported on said vessel and having their armatures rotating in opposite directions in planes that are parallel to the plane of the oscillations and electrically connected to the sources of current supply and to each other whereby the said current supply operates said machines as motors and the excess current from the armature of one machine feeds current to the armature of the other machine, rotatable masses connected to the armatures, a resistance in the circuit of the field of each machine, means for short-circuiting said resistances alternately, stationary contacts, movable with the vessel adapted to engage said stationary contacts, said contacts being connected to said electromagnetic devices, a reversing switch, additional contacts adapted to be brought together by movement of the vessel in its oscillating plane to operate said reversing switch and remove the short-circuit around the first resistance and place a short-circuit around the second resistance.

16. In devices for controlling oscillations of a vessel, two dynamo electric machines supported on said vessel and having their armatures rotating in opposite directions in planes that are parallel to the plane of the oscillation, rotatable masses connected to said armatures to impose equal and opposite reactions on said vessel when both said machines are operating as motors, contacts adapted to be closed by the oscillations of the vessel to convert one of the machines into a generator to produce a reaction with the other machine in opposition to the movement of the vessel, additional contacts adapted to be closed on further oscillation of the vessel to convert the first machine into a motor and the other into a generator before the vessel makes a return cycle in the oscillation.

17. In devices for controlling oscillations of a vessel two dynamo electric machines supported on said vessel and having their armatures rotating in opposite directions in planes that are parallel to the plane of the oscillation, rotatable masses connected to the armatures, contacts closed by movement of the vessel to maintain one of said machines as a motor and the other as a generator and hand operated contacts to continue such condition of the machines for a predetermined time after the vessel tends to make a return cycle.

18. In devices for controlling oscillations of a vessel two dynamo electric machines supported on said vessel and having their armatures rotating in opposite directions in planes that are parallel to the plane of the oscillation, rotatable masses connected to the armatures, means for maintaining one of said machines as a generator and the other as a motor during the major portion of a cycle, and means for converting said motor into a generator and said generator into a motor before the maximum position in the oscillating cycle is reached.

19. In devices for controlling oscillations of a vessel two dynamo electric machines supported on said vessel and having their armatures rotating in opposite directions in planes that are parallel to the plane of the oscillation, rotatable masses connected to the armatures, means for maintaining one of said machines as a generator and the other as a motor during the major portion of a cycle, and means for converting said motor into a generator and said generator into a motor before the maximum position in the oscillating cycle is reached, and means for reducing the maximum field strength of said machines for one or more cycles.

20. In direct current machines, a rotatable armature, a field coil for producing magnetic flux through said armature, means for increasing current in said field coil and a short circuited coil positioned to oppose sudden changes in magnetic flux produced by said field coil to minimize inductive effects caused by such sudden changes.

21. In direct current machines, a rotatable armature, a field core, a field coil for producing magnetic flux in said core and armature, a resistance in circuit with said field coil, means for varying said resistance and a short-circuited coil on said core to oppose sudden changes in said magnetic flux.

22. In devices for controlling oscillations of an object, two dynamo electric machines having armatures rotating in opposite directions in planes parallel to the plane of oscillations, field coils for producing magnetic flux through said armatures, resistances in circuit with said field coils, means for varying said resistances to maintain one machine as a generator and the other as a motor during one portion of a cycle and for maintaining the former as a motor and the latter as a generator during another portion of the cycle and short-circuited coils positioned to oppose sudden changes in the magnetic flux produced by said field coils.

23. The method of stabilizing an oscillating object which consists in rotating two flywheels in opposite directions in planes that are parallel to the plane of oscillation, retarding during one part of the cycle one flywheel, using all the energy of retardation, except for the losses, to speed up the other, retarding during another part of the cycle the second mentioned flywheel, using the energy of retardation, except for the losses, to speed up the first mentioned flywheel and supplying the losses from another source.

24. The method of stabilizing an oscillating object which consists in connecting together the armatures of two dynamo electric machines rotating in opposite directions, causing one to operate as a generator and the other as a motor, and supplying current to said machine only to the extent necessary to make up the losses.

25. In devices for controlling oscillations of an object, two dynamo electric machines having stationary members attached to said object and rotary members rotating in opposite directions in planes parallel to the plane of oscillation, means for maintaining one machine as a generator, and the other as a motor during one portion of the cycle, and the former as a motor and the latter as a generator during another portion of the cycle, means for causing the load of the generator to be absorbed by the motor except for the losses and another source for supplying the losses.

In testimony whereof, I have signed my name to this specification this 11th day of November 1929.

PERRY B. SAMPLE.